Dec. 22, 1925.　　　　　　　　　　　　　　　　　　　　　1,566,405
H. T. JONES
WHEEL LOCKING DEVICE
Filed July 8, 1924

INVENTOR
HAROLD THOMAS JONES
BY
Fetherstonhaugh & Co
ATTORNEYS

Patented Dec. 22, 1925.

1,566,405

UNITED STATES PATENT OFFICE.

HAROLD THOMAS JONES, OF VANCOUVER, BRITISH COLUMBIA, CANADA.

WHEEL-LOCKING DEVICE.

Application filed July 8, 1924. Serial No. 724,913.

*To all whom it may concern:*

Be it known that I, HAROLD THOMAS JONES, a citizen of the United States of America, and a resident of the city of Vancouver, in the Province of British Columbia, Canada, have invented certain new and useful Improvements in Wheel-Locking Devices, of which the following is a specification.

My invention relates to improvements in wheel locking devices, which is particularly adapted for use on automobiles and the like, the objects of which are to provide means whereby a wheel may be rendered immovable about its spindle when desired. A further object is to provide means preventing the removal of the wheel and its hub by unauthorized persons, to dismantle or render inoperative the locking device.

The invention consists essentially of a toothed wheel secured to the spindle of a wheel and one or more toothed dogs carried by the hub, which are adapted to interengage to prevent rotation of the wheel as will be more fully described in the following specification, in which:—

In the drawings like characters of reference indicate corresponding parts in each figure.

Figure 1:
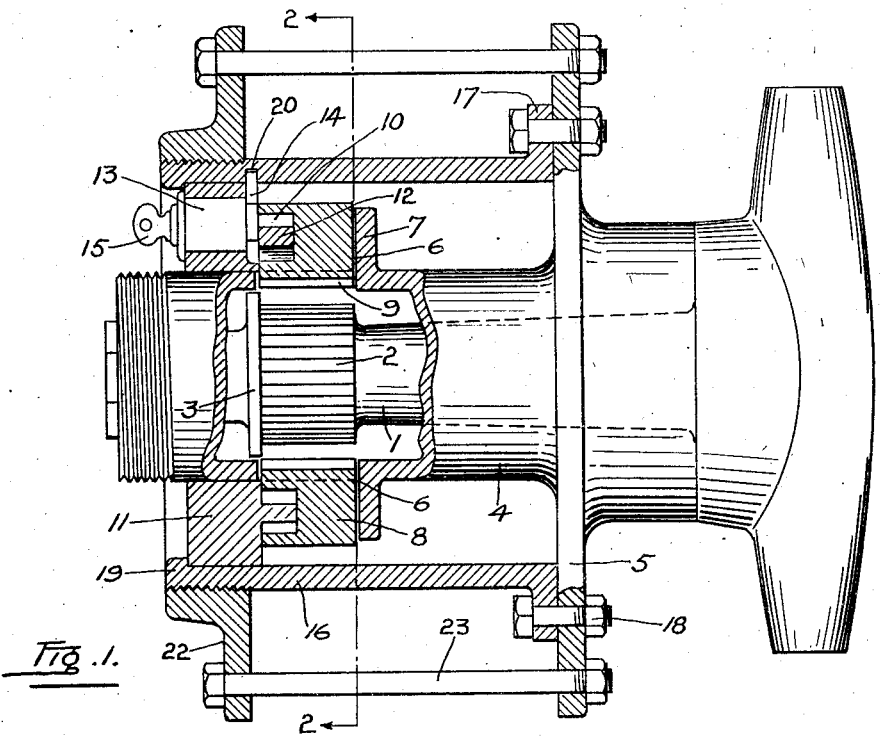
Fig. 1 is a side view part in section of my invention.
Figure 2:
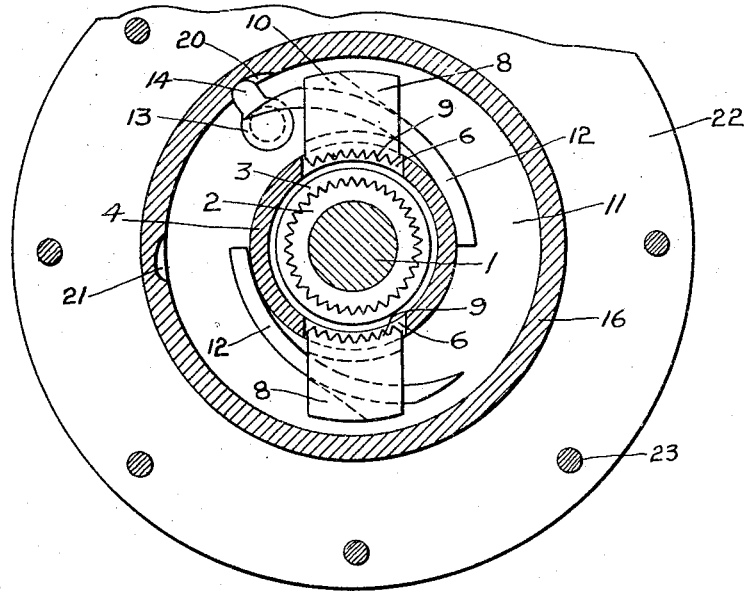
Fig. 2 is a transverse section taken on the line 2—2 of Fig. 1.

The numeral 1 indicates a wheel spindle upon which is securely mounted a toothed wheel 2 having at its outer end a flange 3, the purpose of which will appear later. 4 is a hub rotatable on any suitable anti-friction bearings about the spindle 1 and having an inner flange 5 formed integrally thereon. The hub is provided with a plurality of rectangular apertures 6 surrounding the toothed wheel 2, at the inner side of each of which a vertical guide 7 is formed. Bearing against the guides 7 and projecting inwardly through each of the apertures 6 is a dog 8 having teeth 9 on its inner face which are adapted to engage the toothed wheel 2 and which are provided with a slot 10 on one side.

The numeral 11 indicates an annular ring which is circumferentially movable about the outer end of the hub 4 and is provided on its inner face with a plurality of spiral feather keys 12 which engage the slots 10 of the dogs 8 so that as the ring 11 is rotated about the hub to the left the dogs are withdrawn from engagement with the toothed wheel 2 to permit the free rotation of the hub and its wheel and similarly as the ring 11 is rotated to the right the dogs are driven inwards to engage the toothed wheel 2 and to lock the hub against rotation.

The numeral 13 indicates a lock cylinder mounted in the annular ring 11 and having a latch 14 which is rotatable by a key 15 for the purpose of locking the ring in either of two positions as desired. The numeral 16 indicates a sleeve which is adapted to receive the butt of the wheel spokes (not shown) the inner end of the sleeve is outwardly flanged as at 17 to permit of its being secured to the flange 5 by means of bolts or rivets 18. The outer end of the sleeve is inwardly flanged as at 19 to prevent the outward movement of the ring 11. Slots 20 and 21 are cut in the inner periphery of the sleeve 16 to receive the latch 14 to hold the ring 11 against rotation.

The numeral 22 indicates a flanged ring preferably screwed onto the outer end of the sleeve 16 and which bears against the butt of the spokes of the wheel, the flange ring being connected through the spokes to the flange 5 by a plurality of bolts 23.

Having thus described the several parts of my invention I will now briefly explain its use.

When it is desired to leave the vehicle standing and render it safe against theft the latch 14 is turned by means of the key 15 to withdraw it from the slot 20 of the sleeve 16, the annular ring 11 is then turned to the right, the spiral feather keys 12 thereon moving the toothed dogs to engage the toothed wheel 2, the key is then again turned to bring the latch 14 into engagement with the slot 21 which locks the ring 11 against further movement and leaves the road wheel secured against rotation upon the spindle 1.

It will be noticed that when the wheel is in locked position the flange 3 of the toothed wheel 2 projects beyond the edge of the teeth 9 of the dogs 8, the hub is also locked against endwise movement, so that access to the outer end of the spindle and its outer bearing is of no avail in removing the hub.

What I claim as my invention is:

1. In a wheel locking device, the combination with a spindle and a hub therefor, of a toothed wheel secured upon the spindle, dogs carried by the hub, an annular ring rotatable about the hub and having spiral segments engaging the dogs to move them into and out of engagement with the toothed wheel to lock the hub against rotation about the spindle, and means for locking the annular ring against rotation about the hub.

2. In a wheel locking device the combination with a spindle and a hub therefor, of a toothed wheel secured upon the spindle, dogs carried by the hub, an annular ring rotatable about the hub and carrying spiral segments engaging the dogs to move them into and out of engagement with the toothed wheel, means for locking the annular ring against rotation about the hub and means serving to prevent removal of the hub from the spindle when the hub is locked against rotation by engagement of said dogs with the toothed wheel.

3. In a wheel locking device the combination with a spindle and a wheel hub mounted thereon, of a toothed wheel secured upon said spindle, a dog carried by the hub and movable into and out of said wheel, a ring rotatable relative to the hub and spindle and controlling the movement of said dog, and a locking mechanism carried by the ring including a bolt selectively engageable with recesses in the hub whereby said ring may be locked against rotation when the dog is disposed either in or out of engagement with said toothed wheel.

Dated at Vancouver, B. C., this 16th day of June, 1924.

HAROLD THOMAS JONES.